Patented July 9, 1935

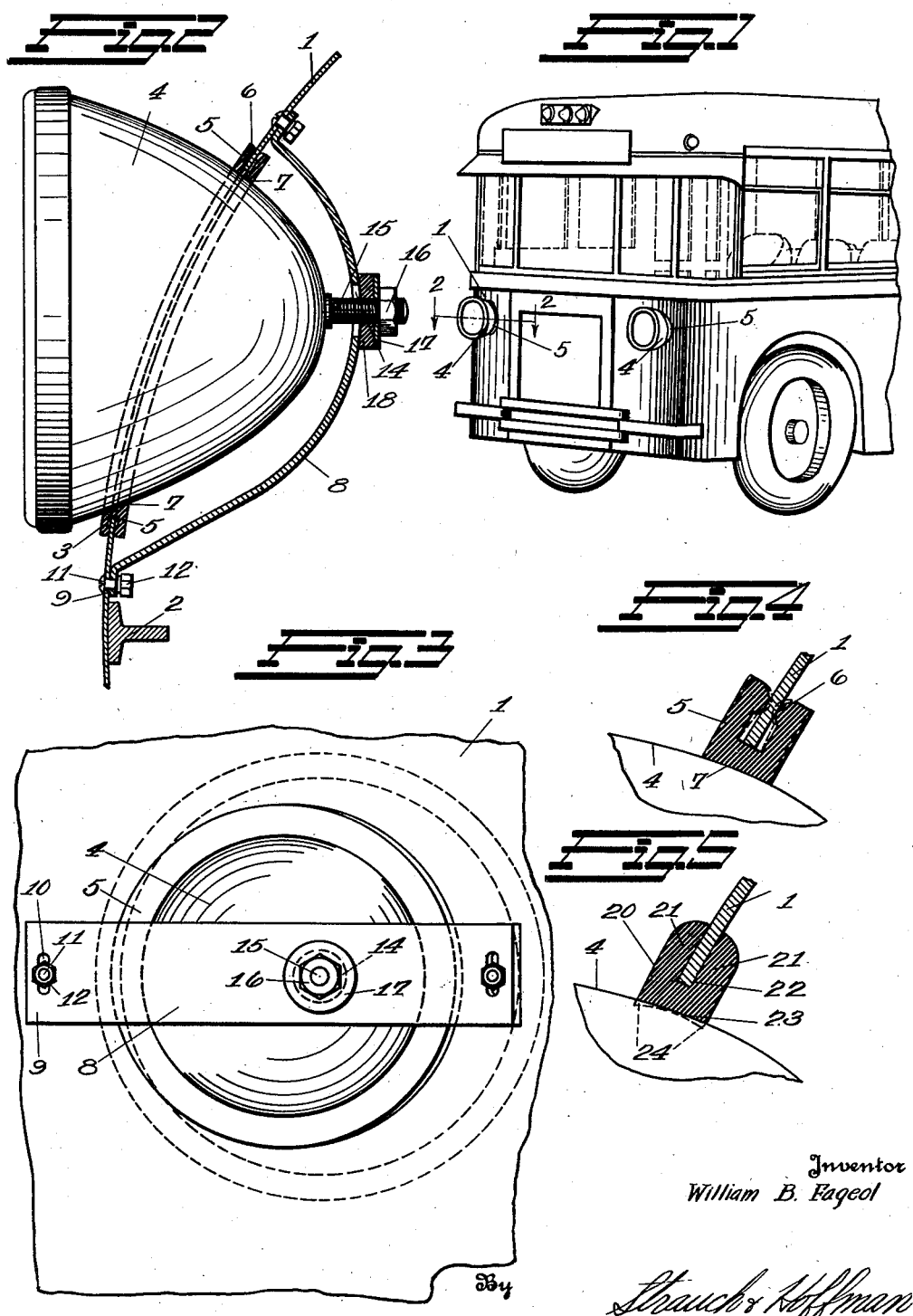

2,007,599

UNITED STATES PATENT OFFICE 2,007,599

HEADLIGHT MOUNTING FOR MOTOR VEHICLES

William B. Fageol, Kent, Ohio, assignor to Twin Coach Company, Kent, Ohio, a corporation of Delaware Application September 22, 1931, Serial No. 564,430

6 Claims. (Cl. 240—7.1)

The present invention relates to a headlight mounting for motor vehicles.

More particularly the invention relates to a headlight mounting for motor vehicles, of the type wherein the body of the vehicle extends to the front of the same, although the headlight mounting may be applied to other types of vehicles or airships with equally good results.

In vehicles where the body of the same extends to the front of the same, the mounting of the headlights on the front wall of the body has presented a difficult problem. Heretofore brackets have been employed to support the headlights with the headlight bracket assembly projecting forwardly from the front wall of the vehicle. These brackets are usually secured to the headlight casing at a central point. The stresses set up in the lamp when the vehicle passes over a rough place in the road, due to the method of securing the lamp to the bracket, are localized stresses and produce a slight flexing of the lamp casing in the region of the bracket securing means. This continual flexing or bending causes the paint to crack off of the casing in this region and the appearance of the lamp is accordingly detracted from. In practice this form of headlight mounting is found to possess several disadvantages. The headlights, in projecting from the vehicle, are often damaged or thrown out of adjustment by other vehicles contacting with them in parking etc. Thus it is obvious that the headlights in these devices are situated in a hazardous location. Moreover, the headlights, being supported by brackets, undergo considerable vibration in the ordinary operation of the vehicle with the result that various parts of the lamp are often shaken loose or broken and the lamp frequently rattles and squeaks, all of which is very undesirable.

Another disadvantage found in the devices heretofore proposed for this purpose resides in the means usually employed to adjust the headlight beam with respect to the road. While the brackets are designed to support the lamp in such a manner that the beam cast thereby will be correct, it is found in practice that the headlights frequently need adjusting, and various ways of adjustment have been proposed and used in all of which the weight of the headlight is sustained through elements capable of relative adjustment. Such arrangements have not been entirely satisfactory.

Accordingly it is an object of this invention to provide an improved headlight mounting that will minimize or eliminate the hazard of the headlights being broken by other vehicles coming into contact with them.

A further object of the present invention is to provide a headlight mounting that will hold the headlight in such a secure manner that no vibration of the same takes place, even when the vehicle is passing over very rough roads whereby the headlight may be constructed of light material.

Another object is to provide a headlight mounting that will support the lamp in such a manner that any stresses set up in the lamp casing are distributed over a large area of the casing, whereby localized stresses and consequent chipping of the finish is eliminated.

A still further object of this invention is to provide an improved headlight-beam adjusting means, which is of ready access, consists of few parts and allows the lamp to be quickly and correctly adjusted or completely removed from the vehicle for replacement of parts or repair.

A further object of the present invention is to provide a headlight mounting and adjusting means wherein the adjusting means does not serve as the sole support for the headlight and in which said means is fully protected against rain and snow whereby corrosion thereof is prevented.

Other objects will appear hereinafter upon proceeding with the description in connection with the annexed drawing. And in which drawing:

Figure 1 is a view of a motor coach with my headlight mounting applied thereto.

Figure 2 is a top sectional view of the headlight mounting and the associated vehicle body structure, taken on line 2—2 of Figure 1.

Figure 3 is a rear view of the headlight mounting assembly of Figure 2.

Figure 4 is an enlarged sectional view of the gasket, and Figure 5 is a sectional view of a modified form of gasket.

Referring to the drawing wherein like reference characters designate like parts throughout the several views, a portion of a panel of the body of the vehicle is shown therein and given the reference numeral 1. This panel 1 is secured to the vertical body rail 2 in any suitable manner.

The curved panel 1 is provided with an opening 3, the size being sufficient to allow a substantial portion of the headlight 4 to be received therein it being understood that while a curved panel is shown my headlight mounting may be applied with equal facility to a flat panel.

The headlight seats on the periphery of the aperture 3 and means are provided for causing the lamp to be maintained in this seating relation, as will hereinafter appear.

While the headlight may seat directly upon the periphery of the opening 3, it is found in practice that a more satisfactory structure is produced when a gasket is interposed between the headlight and the margin of the opening.

A gasket 5 is provided upon which the headlight seats in sealing relation. The gasket is preferably made of rubber, however, any suitable resilient material may be used. The gasket is provided with two peripheral flanges and is substantially U-shaped in cross section, the inner face of each flange thereof being provided with an annular rib 6 which firmly abuts the opposite faces of the panel and prevents rain, dust, etc. from entering the interior of the coach. Referring to Figure 4, the dotted lines disclose the shape of the gasket, somewhat exaggerated, as it appears as initially formed and before being applied to the panel, the ribs 6 being disclosed as closely adjacent each other. When the gasket has been forced into position in the opening and the flanges thereof disposed on either side of the panel as shown in full lines in the same figure, it will be understood that the ribs 6 in being forced apart tend to return to normal position. This tendency causes the ribs to firmly engage the opposite faces of the panel, thus producing a very efficient joint.

The headlight casing seats upon the inner wall 7 of the gasket and is detachably and adjustably held in this position by the means now to be described.

A curved support 8 spans the opening 3 and each of the outturned ends 9 thereof is slotted at 10 and secured to the rear wall of the panel by a bolt 11 and nut 12, the bolt 11 passing an aperture in the panel and the slot in the support.

The support is provided near the center thereof with an aperture 14 which loosely receives a threaded stud 15 which in turn is secured by welding or riveting in well known manner to the rear of the headlight casing. The headlight is drawn into the panel opening and against the gasket by means of a nut 16 threaded upon the stud 15 and bearing against a washer 17 and block 18, the block abutting the support in clamping relation. While the block 18 may be made of any suitable material such as steel, wood or fibre, rubber has been found to be the most satisfactory material in this relation and is accordingly preferred. It will be noted that in forming the block 18 of rubber the entire mounting of the headlight is established through rubber members, that is the headlight casing seats upon the rubber gasket 5 and is clamped into such position by means of a rubber block, thereby producing a shock absorbing mounting which is very satisfactory in practice.

While the form of support just described is to be preferred, it is understood that some other form of support may be used to hold the headlight in the opening and the functions of the gasket assembly will remain unchanged.

In Figure 5 I have disclosed a modified form of gasket, 20, which is similar to the first form disclosed in that it is substantially U-shaped in cross-section. This gasket is provided with two flanges 21 which have flat inner faces 22. The base portion 23 of this gasket conforms to the shape of the headlight casing 4 in the full line showing. The dotted line showing represents the configuration of the gasket before the headlight is placed in the opening. In the dotted line showing it is seen that the base 25 of the gasket is provided with a pair of raised portions 24, which increases in height toward the edge of the gasket. This form of gasket also produces a very efficient joint, as it will be readily understood that when the headlight is forced into the opening in contact with the raised portions 24 the headlight wall will cause them to be compressed and rotate slightly about the center of the base and thus force the flanges 21 into very firm abutting relation with the opposite faces of the panel 1.

It is also contemplated to use this headlight mounting in connection with motor vehicles of the conventional type, for instance the same might be mounted in an opening in the crown of the fender.

This type of headlight mounting is also applicable to airships for the mounting of landing lights. For instance the leading edge of the wing may be provided with an opening and the landing light mounted therein in the manner above disclosed. This form of construction should offer but little air resistance.

As a matter of fact this mounting may be used to support any kind of lamp in any kind of device whether the device has plane or curved walls.

From a consideration of the above disclosure it is readily understood that when it is desired to adjust the position of the headlight the nut 16 is loosened. Due to the relatively large aperture 14 in the support, the stud 15 is allowed considerable latitude in its swinging movements and the headlight can be rotated to any desired adjusted position. The headlight, in being rotated, functions with its annular seat on the gasket as a ball and socket or universal joint which permits of both up and down and side to side adjustments of the headlight to be effected.

It is also noted from the foregoing disclosure that the securing means and the adjusting means for the headlight are one and the same, and they are located inside the coach whereby they cannot become corroded by the elements.

The provision of the slots 10 in the support permits the headlight assembly to be accurately aligned with the panel, and are especially useful when the bolt holes have not been quite accurately drilled in the panel.

It will further be seen from the disclosure that I have provided a headlight mounting that effectively supports the headlight and at the same time presents a unitary appearance.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having now clearly disclosed my invention what I claim and desire to secure by Letters Patents of the United States is:

1. A headlight mounting comprising a vehicle member providing a wall, an opening in said wall designed to provide a socket, a tapered headlight casing projected into said opening from the front of said member and being in frictional engagement with said socket, a support mounted on said vehicle in cooperative relationship with said opening and having an aperture therein, a threaded stud secured to said headlight casing and extending through said aperture, said aperture being relatively large with respect to the diameter of said stud, and a nut turned on said stud to operatively engage said support, to draw said casing into supporting engagement with said socket and whereby when said nut is loosened the headlight may be adjusted in said socket by causing said stud to assume various adjusted positions within said aperture.

2. A headlight mounting comprising a vehicle member providing a wall, an opening formed in said wall and designed to provide a socket; a headlight extended through said opening and being in frictional engagement with said socket; a curved support having outturned ends positioned back of said opening, the outturned ends of said support being secured to said wall; a threaded stud secured to and projecting from said headlight into a relatively large aperture in said support, a yielding washer on said stud and a nut turned on said stud and bearing against said washer to cause the same to abut said support, whereby said headlight is detachably, adjustably held in operative position in said socket.

3. A headlight mounting comprising a vehicle member providing a wall, an opening formed in said wall; a resilient shock absorbing gasket having a soft face disposed around said opening and in engagement therewith, said gasket having opposed flanges thereon, said flanges abutting opposite faces of said wall, and a headlight having a tapered casing mounted in said opening in frictional engagement with said gasket, whereby the yielding engaging face of the gasket takes the contour of said casing and a tight joint is produced.

4. A gasket designed for cooperation with an opening in a wall to space a member disposed in said opening from said wall, comprising an annulus having opposed flanges thereon for abutting opposite faces of said wall, the inner face of said annulus having spaced circumferential wedge shaped projections thereon, whereby when a member is inserted into said opening and in engagement with said projections, the said flanges will be rotated about the base of said gasket and caused to firmly abut the opposite faces of said wall thereby producing a tight joint.

5. A headlight mounting comprising a vehicle body member providing a vertically extending front wall having an opening therein, a headlight having a tapered casing projecting into said opening from the front and with the tapering end extending rearwardly of said member, said tapered headlight casing extending substantially into and being in contact with the periphery of said opening; and means to draw said headlight rearwardly into said opening, whereby said tapered casing engages and is supported by the periphery of said opening.

6. A headlight mounting comprising a vehicle body member providing a wall, an opening formed in said wall; a gasket disposed around the periphery of said opening and in sealing engagement with said member, a headlight having a tapered casing projected into said opening from the front and with the tapering and extending rearwardly of said member, said tapered headlight casing being in frictional sealing engagement with said gasket; and means to draw said headlight rearwardly into said opening, whereby said tapered casing cams said gasket outwardly into clamping sealing engagement with said member.

WILLIAM B. FAGEOL.